Feb. 4, 1930.  C. C. GOODRICH  1,745,755
BALL AND SOCKET JOINT
Filed July 24, 1926
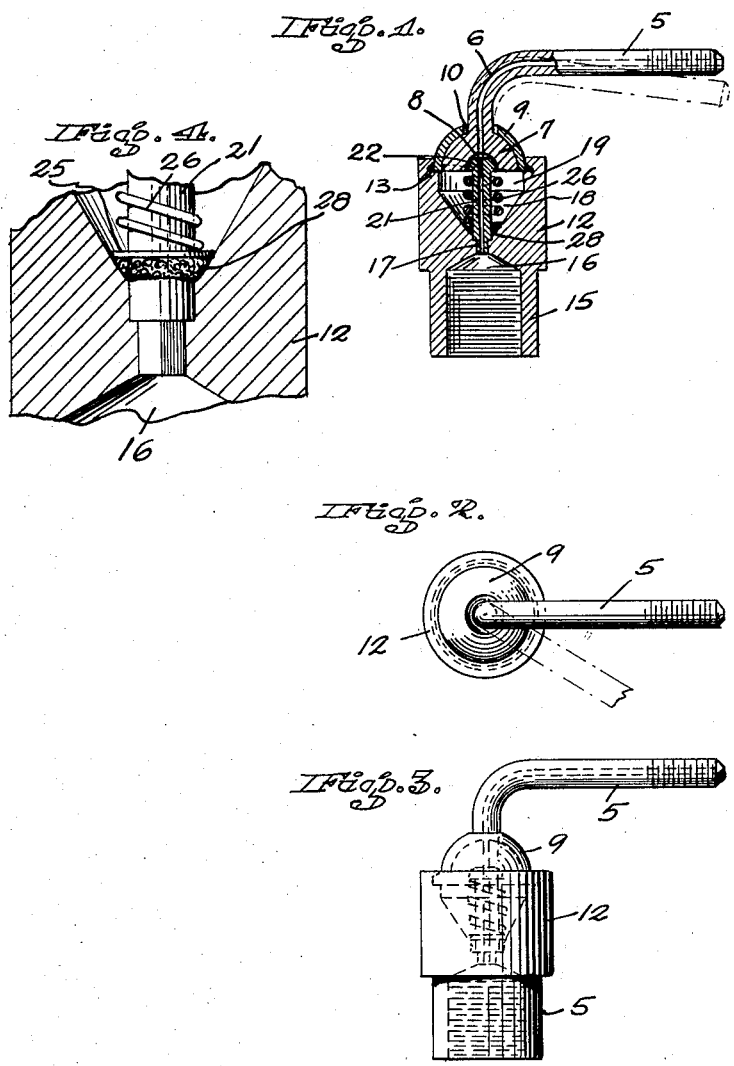
Inventor
Coy C. Goodrich
By
Attorney Patented Feb. 4, 1930

1,745,755

UNITED STATES PATENT OFFICE

COY C. GOODRICH, OF SAN FRANCISCO, CALIFORNIA

BALL-AND-SOCKET JOINT

Application filed July 24, 1926. Serial No. 124,751.

This invention relates to ball and socket joints and is particularly useful in lubricating systems in lieu of flexible tubing.

An object of this invention is the provision of a ball and socket joint for a lubricating system or other apparatus, the device constructed in accordance with my invention being one which is simple, easy to assemble and effective in operation.

With the foregoing object in view, together with such other objects and advantages as may subsequently appear, this invention resides in the construction and arrangement of parts hereinafter described and claimed, and illustrated in the accompanying drawings, in which Figure 1 is substantially a central longitudinal section of a device of my invention;

Figure 2 is a plan view of Figure 1;

Figure 3 is a side elevation of the device shown in Figure 1; and

Figure 4 is an enlarged fragmentary view of Figure 1.

Referring to the drawings for a more detailed description thereof, the numeral 5 indicates a tube threaded at its outer end. This tube is shown bent at 6 and as being enlarged at its lower end. This enlargement 7 is substantially hemispherical and is provided with a hemispherical recess 8 in its lower face. A shell 9 having an aperture 10 is slipped over the tube 5 until it rests on the enlargement 7 of the tube. The diameter of the aperture 10 is greater than the outside diameter of the tube 5 so that the latter may move in vertical planes.

The shell 9 is substantially hemispherical interiorly so that the enlargement 7 moves readily on the inner surface of the shell. The vertical portion of the tube 5 may thus be turned within the shell. From the described relation of the tube to the shell it will be readily understood that the tube has a universal movement relative to the shell.

The lower end of the shell 9 fits into a member 12 and rests on an annular shoulder 13 formed therein. The shell may be secured to the member 12 by crimping the upper surface of the latter on the former. The shell 9 and the member 12 may be regarded as forming a socket. The socket member 12 is provided with an aperture longitudinally therethrough. This aperture is threaded interiorly at its lower portion 15 and is tapered inwardly at 16 above the threaded portion 15. The portion of the aperture above and adjoining the tapered portion 16 is square and is indicated by the numeral 17. Immediately above the squared portion 17 of the aperture, the latter tapers outwardly as it rises, as indicated by the numeral 18, above which it is uniform in diameter as shown at 19.

A tube 21 is disposed in the aperture of the socket member 12 with its aperture in alignment with the vertical portion of the aperture of the tube 5 and in alignment also with the lower portion 15 of the aperture in the member 12.

The tube 21 has an enlarged hemispherical end or head 22 fitting into the hemispherical recess 8 of the enlargement. The similar contours of the head 22 and the recess 8 allow the enlargement 7 to turn on the head 22. The lowermost portion of the tube 21 is square and fits snugly into the squared portion 17 of the aperture through the socket member 12 to prevent its turning relative to the latter.

An apertured disk 25 fits loosely around the tube 21 and is pressed downwardly by a coiled spring 26, the upper end of which bears against the hemispherical head 22 of the tube 21. Packing 28 is disposed below the disk 25 in the cone-shaped portion 18 of the aperture in the member 12. This packing is compressed by the pressure exerted on the plate 25 by means of the coiled spring 26. This compression of the packing 28 is effective to prevent the leakage of oil into the conical portion 18 of the aperture in the member 12.

While I have described one embodiment of my invention, modifications thereof may be readily devised without departing from the spirit of my invention, and it is to be understood that such modifications come within the scope of the appended claim.

I claim:

In a device of the type described, a body member, a pipe having a universal connection therewith, a second pipe having a slidable liquid-tight connection with a passageway in said body member and spring means for urging said second named pipe into said first named pipe for making a liquid-tight connection therewith, the restricted portion of said passageway being non-circular in cross section for preventing the rotatoin of said second named pipe.

COY C. GOODRICH.